(12) United States Patent
Thandapani et al.

(10) Patent No.: US 12,346,894 B2
(45) Date of Patent: *Jul. 1, 2025

(54) SYSTEM AND METHOD FOR DYNAMICALLY RETRIEVING AN ATTRIBUTE VALUE OF AN IDENTITY CLAIM FROM AN ISSUING PARTY USING A DIGITALLY SIGNED ACCESS TOKEN

(71) Applicant: Workday, Inc., Pleasanton, CA (US)

(72) Inventors: Kamalanathan Thandapani, Livermore, CA (US); Lionello G. Lunesu, Peng Chau (HK); Aneesh Sandeep Verenkar, San Francisco, CA (US); Keith Kowal, Pleasanton, CA (US); Prakash Sundaresan, Redmond, WA (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,323

(22) Filed: Feb. 13, 2024

(65) Prior Publication Data

US 2024/0185226 A1    Jun. 6, 2024

Related U.S. Application Data

(63) Continuation of application No. 18/174,051, filed on Feb. 24, 2023, now Pat. No. 11,948,145, which is a
(Continued)

(51) Int. Cl.
*G06Q 20/36* (2012.01)
*G06Q 20/38* (2012.01)
*H04L 9/32* (2006.01)

(52) U.S. Cl.
CPC ....... *G06Q 20/3674* (2013.01); *G06Q 20/363* (2013.01); *G06Q 20/3821* (2013.01);
(Continued)

(58) Field of Classification Search
None
See application file for complete search history.

(56) References Cited

U.S. PATENT DOCUMENTS

8,316,237 B1 * 11/2012 Felsher ................. H04L 63/061
380/282
9,397,980 B1 * 7/2016 Chen ........................ G06F 21/33
(Continued)

*Primary Examiner* — Radu Andrei
*Assistant Examiner* — Nakia Leffall-Allen
(74) *Attorney, Agent, or Firm* — Van Pelt, Yi & James LLP (57) ABSTRACT

A processor-implemented system and method for dynamically retrieving an attribute value of an identity claim for a user using a digitally signed access token that is digitally signed by a user device, at a relying party device associated with a relying party. The method includes (i) making an API call to retrieve at least one identity claim for the user, (ii) processing each identity claim of the user to identify if at least one by-reference identity claim that includes a URL of an endpoint, (iii) obtaining the digitally signed access token that is digitally signed by the user device, (iv) invoking the URL of the endpoint with the at least one by-reference identity claim and the digitally signed access token, and (v) dynamically retrieving the attribute value from the URL of the endpoint from an issuing party device associated with an issuing party.

18 Claims, 8 Drawing Sheets

Related U.S. Application Data continuation of application No. 16/868,415, filed on May 6, 2020, now Pat. No. 11,615,403.

(60) Provisional application No. 62/852,764, filed on May 24, 2019.

(52) U.S. Cl.
CPC ....... G06Q 20/3829 (2013.01); H04L 9/3213 (2013.01); H04L 9/3247 (2013.01)

(56) References Cited

U.S. PATENT DOCUMENTS

| | | | |
|---|---|---|---|
| 10,171,476 B2 | 1/2019 | Khan | |
| 10,373,158 B1* | 8/2019 | James | G06Q 40/04 |
| 10,637,665 B1* | 4/2020 | Sundaresan | H04L 63/083 |
| 10,735,197 B2* | 8/2020 | Sundaresan | H04L 9/3226 |
| 11,139,955 B1* | 10/2021 | So | G06Q 20/3674 |
| 11,615,403 B1* | 3/2023 | Thandapani | H04L 9/3213 705/67 |
| 2004/0162786 A1 | 8/2004 | Cross | |
| 2008/0244722 A1 | 10/2008 | Satish | |
| 2009/0132813 A1* | 5/2009 | Schibuk | G06Q 20/4014 726/9 |
| 2009/0300747 A1* | 12/2009 | Ahn | G06F 21/6245 726/9 |
| 2010/0250955 A1* | 9/2010 | Trevithick | G06F 21/31 713/185 |
| 2010/0299738 A1 | 11/2010 | Wahl | |
| 2013/0185210 A1* | 7/2013 | Dodson | G06Q 20/40 705/44 |
| 2015/0074774 A1 | 3/2015 | Nema | |
| 2015/0112870 A1* | 4/2015 | Nagasundaram | G06Q 20/3821 705/67 |
| 2018/0157535 A1 | 6/2018 | Dushok | |
| 2018/0218121 A1* | 8/2018 | Gassner | G06Q 30/018 |
| 2019/0089710 A1* | 3/2019 | Weinert | H04L 9/3226 |

* cited by examiner

SYSTEM AND METHOD FOR DYNAMICALLY RETRIEVING AN ATTRIBUTE VALUE OF AN IDENTITY CLAIM FROM AN ISSUING PARTY USING A DIGITALLY SIGNED ACCESS TOKEN

CROSS REFERENCE TO OTHER APPLICATIONS

This application is a continuation of U.S. patent application Ser. No. 18/174,051, entitled SYSTEM AND METHOD FOR DYNAMICALLY RETRIEVING AN ATTRIBUTE VALUE OF AN IDENTITY CLAIM FROM AN ISSUING PARTY USING A DIGITALLY SIGNED ACCESS TOKEN filed Feb. 24, 2023 which is incorporated herein by reference for all purposes, which is a continuation of U.S. patent application Ser. No. 16/868,415, entitled SYSTEM AND METHOD FOR DYNAMICALLY RETRIEVING AN ATTRIBUTE VALUE OF AN IDEN- TITY CLAIM FROM AN ISSUING PARTY USING A DIGITALLY SIGNED ACCESS TOKEN filed May 6, 2020 which is incorporated herein by reference for all purposes, which claims priority to U.S. Provisional Patent Application No. 62/852,764 entitled SYSTEM AND METHOD FOR DYNAMICALLY RETRIEVING AN ATTRIBUTE VALUE OF AN IDENTITY CLAIM FROM AN ISSUING PARTY USING A DIGITALLY SIGNED ACCESS TOKEN filed May 24, 2019 which is incorporated herein by reference for all purposes.

BACKGROUND OF THE INVENTION

Claims-based identity is a common way for applications to acquire identity information they need about users inside their organization, in other organizations, and on the Internet. Claims-based identity also provides a consistent approach for applications running on-premises or in the cloud. The claims-based identity abstracts individual elements of identity and access control into two parts: a notion of claims, and a concept of an issuer or an authority. Wikimedia Foundation (https://en.wikipedia.org/wiki/Claims-based_identity). In general, an entity (real or virtual) can have multiple identities and each identity can encompass multiple attributes, some of which are unique within a given name space. Wikimedia Foundation (https://en.wikipedia.org/wiki/Identity_management).

In a digital identity system, an issuing party issues a digitally signed identity claim to a user, who is a subject of the identity claim. Typically, identity claims embed an attribute value such as a first name, a last name and a date of birth of the user (e.g., "John", "Doe", "01/01/2001") in the identity claim itself, which is typically represented as an X.509 certificate or a JavaScript Object Notation (JSON) Web Token (JWT) digitally signed by the Issuing Party. However, some of these attributes change often. In one example, an issuing party may be a credit rating agency that issues the identity claims for the user, which include an attribute that varies with time, such as a credit score. A relying party may be a loan provider, such as a bank. The bank may sanction a loan or issue a credit card based on the identity claim, which may include a credit score of the user. Since the credit score of the user may vary every month, embedding the attribute value in the identity claim means that each time the attribute value changes; the user has to incur the burden of obtaining a new identity claim from the issuing party.

In another example, the relying party may be a hospital or a healthcare provider, and the issuing party may be a laboratory that provides a diagnostic report. The diagnostic report may be too large in size for transmission in many cases. For example, the user may request the issuing party to issue the diagnostic report (e.g., an X-ray or Magnetic Resonance Imaging (MRI) image) as part of an identity claim. The user may share his/her identity claim with the relying party, who makes a request for an attribute value (e.g., a diagnostic report of the user). In this example, the attribute value, which is the diagnostic report, may be too large in size, making it inconvenient to embed in an X.509 certificate or JWT. Accordingly, there remains a need for improving on existing approaches for providing benefits of the digitally signed identity claims.

BRIEF DESCRIPTION OF THE DRA WINGS

The embodiments herein will be better understood from the following detailed description with reference to the drawings, in which.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention.

Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for dynamically retrieving an attribute value of an identity claim is disclosed. The system is configured to 1) make an application programming interface (API) call, with the relying party device, to retrieve the at least one identity claim for the user; 2) process each identity claim of the user with the relying party device, to identify at least one by-reference identity claim that includes a uniform resource locator (URL) of an endpoint; 3) obtain (e.g., request and receive), with the relying party device, the digitally signed access token that is digitally signed by the user device; 4) invoke, with the relying party device, the URL of the endpoint with the at least one by-reference identity claim and passing in the digitally signed access token; and 5) dynamically retrieve, with the relying party device, the attribute value from the URL of the endpoint from an issuing party device associated with an issuing party.

In some embodiments, the relying party device makes the API call to retrieve the at least one identity claim for the user from a digital identity wallet (DIW) application associated with the user device.

In some embodiments, the relying party device makes the API call based on an authentication protocol layered on an authorization protocol. In some embodiments, the authorization protocol includes at least one parameter. In some embodiments, the at least one parameter is selected from (i) an API authorization endpoint, (ii) a client ID, (iii) a call back URL, (iv) a response type, and (v) a scope.

In some embodiments, the relying party device specifies a request for the at least one identity claim in the scope of the authorization protocol to retrieve the at least one identity claim from the digital identity wallet application.

In another aspect, a processor-implemented method for generating at least one identity claim as at least one by-reference identity claim at an issuing party device associated with an issuing party and dynamically returning an attribute value associated with the at least one by-reference identity claim to a relying party device associated with a relying party is provided. The method includes the steps of (i) generating, with the issuing party device, the at least one identity claim as the at least one by-reference identity claim that includes a URL of an endpoint, (ii) issuing, with the issuing party device, the at least one by-reference identity claim to a user device associated with a user, (iii) listening, with the issuing party device, to the URL of the endpoint that is invoked by the relying party device to obtain (e.g., request and receive) the at least one by-reference identity claim and a digitally signed access token, (iv) validating, with the issuing party device, the digitally signed access token, and (v) dynamically returning, with the issuing party device, the attribute value associated with the at least one by-reference identity claim to the relying party device associated with the relying party if the digitally signed access token is valid.

In some embodiments, the at least one by-reference identity claim is generated by embedding a user public key of the user in the at least one identity claim and specifying the URL of the endpoint in the at least one by-reference identity claim.

In some embodiments, the issuing party device validates the digitally signed access token by verifying that the user public key associated with the at least one identity claim corresponds to a user private key that was used to digitally sign the digitally signed access token.

In some embodiments, if the relying party device invokes the URL of the endpoint with a digitally signed access token that has an expiration time, the issuing party device does not share the attribute value of the identity claim with the relying party if the specified expiration time has occurred or has passed.

In some embodiments, the attribute value is a derived attribute value which is derived from an actual attribute value. In some embodiments, the derived attribute value is dynamically retrieved by the relying party device associated with the relying party.

In some embodiments, the user device (i) obtains the at least one identity claim as the at least one by-reference identity claim from the issuing party device, (ii) digitally signs the access token to obtain the digitally signed access token, (iii) obtains (or receives) an API call from the relying party device, and (iv) sends the at least one by-reference identity claim and the digitally signed access token that corresponds to the at least one identity claim to the relying party device based on the API call. In some embodiments, the at least one by-reference identity includes the URL of the endpoint of the attribute value.

In some embodiments, the relying party device (i) makes the API call to retrieve the at least one identity claim for the user and (ii) processes each identity claim of the user to identify the at least one by-reference identity claim that includes the URL of the endpoint.

In some embodiments, the relying party device further (i) obtains the digitally signed access token that is digitally signed by the user device, (ii) invokes the URL of the endpoint with the at least one by-reference identity claim and the digitally signed access token, and (iii) dynamically retrieves the attribute value from the URL of the endpoint from the issuing party device.

In another aspect, one or more non-transitory computer readable storage mediums storing the one or more sequences of instructions, which when executed by one or more processors, further causes a method for generating at least one identity claim as at least one by-reference identity claim at an issuing party device associated with an issuing party and dynamically returning an attribute value associated with the at least one by-reference identity claim to a relying party device associated with a relying party is provided. The method includes the steps of (i) generating, with the issuing party device, the at least one identity claim as the at least one by-reference identity claim that includes a URL of an endpoint, (ii) issuing, with the issuing party device, the at least one by-reference claim to a user device associated with a user, (iii) listening, with the issuing party device, to the URL of the endpoint that is invoked by the relying party device to obtain (e.g., request and receive) the at least one by-reference identity claim and a digitally signed access token, (iv) validating, with the issuing party device, the digitally signed access token, and (v) dynamically returning, with the issuing party device, the attribute value associated with the at least one by-reference identity claim to the relying party device associated with the relying party if the digitally signed access token is valid.

In some embodiments, the at least one by-reference identity claim is generated by embedding a user public key of the user in the at least one identity claim and specifying the URL of the endpoint in the at least one by-reference identity claim.

In some embodiments, the relying party device (i) makes an API call to retrieve the at least one identity claim for the user, (ii) processes each identity claim of the user, to identify the at least one by-reference identity claim that includes the URL of the endpoint, (iii) obtains (e.g., requests and receives) the digitally signed access token that is digitally signed by the user device, (iv) invokes the URL of the endpoint with the at least one by-reference identity claim and the digitally signed access token, and (v) dynamically retrieves the attribute value from the URL of the endpoint from the issuing party device.

In another aspect, a non-transitory computer readable storage medium storing a sequence of instructions, which when executed by a processor, causes a method for sending at least one by-reference identity claim and a digitally signed access token from a user device associated with a user to a relying party device associated with a relying party is provided. The sequence of instructions include (i) obtaining (or receiving), with the user device, at least one identity claim as the at least one by-reference identity claim from an issuing party device associated with an issuing party, (ii) digitally signing, with the user device, an access token to obtain a digitally signed access token, (iii) obtaining (or receiving), with the user device, an API call from the relying party device, and (iv) sending, with the user device, the at least one by-reference identity claim and the digitally signed access token that corresponds to the at least one identity claim to the relying party device associated with the relying party based on the API call.

In some embodiments, the user device associated with the user unlocks access to a digital identity wallet (DIW) application with at least one of: (i) a biometric; or (ii) a Personal Identification Number (PIN) code of the user. In some embodiments, the digital identity wallet application verifies at least one of (i) the biometric or (ii) the PIN code by comparing the at least one of the biometric or the PIN code with at least one of a previously registered biometric associated with the user or a previously registered PIN code associated with the user.

In some embodiments, the digitally signed access token is valid for a specified period of time.

In some embodiments, the user device digitally signs the access token using the user private key.

In another aspect, a system is provided. The system includes a device processor and a non-transitory computer readable storage medium storing one or more sequences of instructions, which when executed by the device processor, causes a method for dynamically retrieving an attribute value of at least one identity claim for a user using a digitally signed access token that is digitally signed by a user device, at a relying party device associated with a relying party by performing the steps of: (i) making an API call, with the relying party device, to retrieve at least one identity claim for the user, (ii) processing each identity claim of the user with the relying party device, to identify at least one by-reference identity claim that includes a URL of an endpoint, (iii) obtaining, with the relying party device, the digitally signed access token that is digitally signed by the user device, (iv) invoking, with the relying party device, the URL of the endpoint with the at least one by-reference identity claim and the digitally signed access token, and (v) dynamically retrieving, with the relying party device, the attribute value from the URL of the endpoint from an issuing party device associated with an issuing party.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments.

There remains a need for a system and method for handling frequently changing attribute values or attribute values that are too large in size to embed in the identity claim. Referring now to the drawings, and more particularly to FIGS. 1 through 8, where similar reference characters denote corresponding features consistently throughout the figures, there are shown preferred embodiments.

The system improves the computer by enabling security for the computer system allowing appropriate acquisition of an attribute of an identity claim. This system allows secure use of the attribute of the identity claim for use by a user making the computer system more efficient at handling and authorizing use of data for verification and/or authentication.

Figure 1:
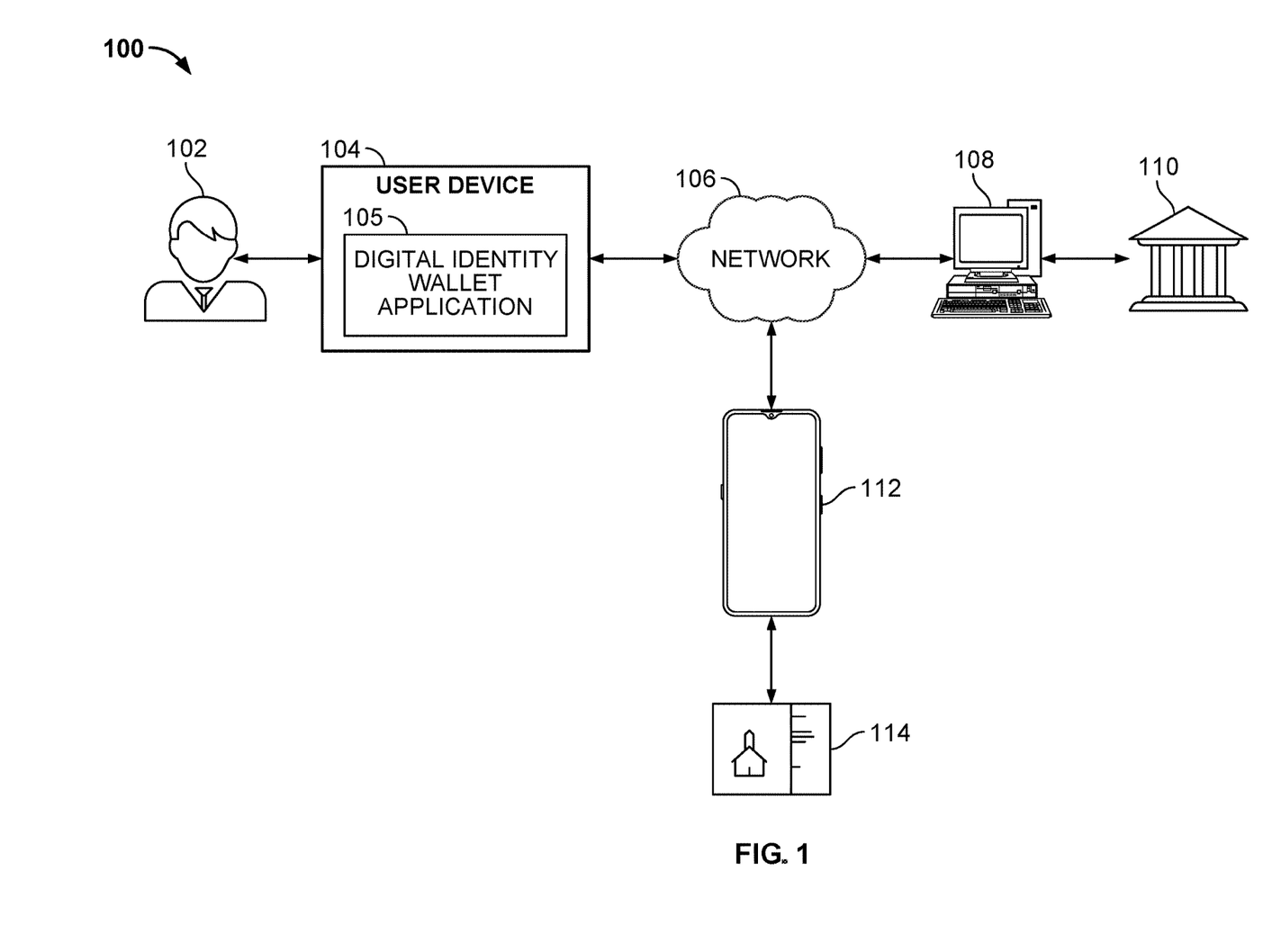
FIG. 1 is a block diagram that illustrates a relying party device associated with a relying party communicating with a user device associated with a user and an issuing party device associated with an issuing party through a network according to some embodiments herein.

FIG. 1 is a block diagram 100 that illustrates a relying party device 112 associated with a relying party 114 communicating with a user device 104 associated with a user 102 and an issuing party device 108 associated with an issuing party 110 through a network 106 according to some embodiments herein. The block diagram 100 includes the user device 104 associated with the user 102, the network 106, the issuing party device 108 associated the issuing party 110 and the relying party device 112 associated with the relying party 114. The user device 104 may include a portion of a Digital Identity Management (DIM) system (e.g., a Digital Identity Wallet (DIW) application 105). In some embodiments, the user device 104, without limitation, may be selected from a mobile phone, a Personal Digital Assistant (PDA), a tablet, a desktop computer, a server, or a laptop. The issuing party 110 may be a party that is authorized to certify one or more attributes in the identity claim. In some embodiments, the issuing party 110 may be a bank, a diagnostic laboratory, a credit rating agency etc. The relying party 114 may be a party that relies on the attribute value certified by the issuing party 110. In some embodiments, the relying party 114 may be a hospital, a loan provider, an insurance provider etc. The user device 104 may communicate with the relying party device 112 and the issuing party device 108 through the network 106. In some embodiments, the network 106 is a wired network, a wireless network, or a combination of a wired network a wireless network. In some embodiments, the network 106 is the Internet.

In some embodiments, the user device 104 associated with the user 102 unlocks access to the digital identity wallet application 105 with at least one of: (i) a biometric; or (ii) a Personal Identification Number (PIN) code of the user 102. In some embodiments, the digital identity wallet application 105 verifies at least one of (i) the biometric or (ii) the PIN code by comparing the at least one of the biometric or the PIN code with at least one of a previously registered biometric associated with the user 102 or a previously registered PIN code associated with the user 102. The user 102 may request the issuing party 110 to issue at least one identity claim for at least one of: (i) a first name, (ii) a last-name, (iii) a date-of-birth, and (iv) a credit score via the user device 104. In some embodiments, the issuing party device 108 receives the request from the user 102 and issues each identity claim statically incorporating at least one attribute value or a dynamic reference to at least one attribute value. In some embodiments, some of the attribute values may vary with time (e.g., the credit score of the user 102). Alternatively, in some embodiments, the user 102 requests the issuing party 110 to issue the identity claim for a file that is too large in size to be embedded in an identity claim, such as an x-ray image of a body part such as a hand of the user 102, or for a Magnetic Resonance Imaging (MRI) image of the user 102.

In some embodiments, the issuing party device 108 embeds a uniform resource locator (URL) of an endpoint from which the actual value can be retrieved at a later time by presenting an appropriately signed access token. In some embodiments, the issuing party device 108 issues the at least one identity claim as a by-reference identity claim by specifying the URL of the endpoint (e.g., the URL of the endpoint of the attribute value such as the credit score of the user 102 in the by-reference identity claim). In some embodiments, the access token is constructed by the User device at the time of claim retrieval in order to authorize the Relying Party to retrieve the attribute value by invoking the URL specified in the by-reference claim and passing in this access token. In some embodiments, the at least one identity claim as the by-reference identity claim is generated by embedding a user public key of the user 102 in the at least one identity claim. In some embodiments, the identity claims statically embed the attribute value (e.g., for attributes that are static and/or that are small in size). In some embodiments, the identity claims may dynamically retrieve the attribute value from the URL of the endpoint. In some embodiments, the endpoint is the URL on a web server.

In some embodiments, the user 102 stores the identity claims in the digital identity wallet application 105. In one example embodiment, the issuing party device 108 issues the identity claims for at least one of (i) the first-name, (ii) the last-name, and (iii) the date-of-birth of the user 102 as the attribute values. The issuing party device 108 issues the by-reference identity claim for attributes that vary with time (e.g., the credit score of the user 102). If the relying party device 112 wants the credit score of the user 102, the relying party device 112 may invoke the URL of the endpoint that is specified in the at least one by-reference identity claim and pass in a digitally signed access token that is digitally signed by the user device 104.

For example, the user 102 may initiate a loan process to apply for a loan from the relying party 114 (e.g., a bank) based on the at least one identity claim that is stored in the digital identity wallet application 105. For example, the user 102 may request the relying party 114 to provide a loan based on the at least one identity claim that is stored in the digital identity wallet application 105.

The relying party device 112 makes an API call to retrieve the at least one identity claim for the user 102 from the digital identity wallet application 105. In some embodiments, the relying party device 112 makes the API call based on an authentication protocol layered on an authorization protocol. In some embodiments, the relying party device 112 requests the digital identity wallet application 105 for the at least one identity claim using client libraries. In some embodiments, the authentication protocol is an OpenID Connect protocol and the authorization protocol is an OAuth 2.0 protocol. OpenID Connect is an identity layer on top of an OAuth 2.0 protocol, which enables computing clients to verify an identity of the user 102 based on an authentication performed by an authorization application server, as well as to obtain basic profile information about the user 102 in an interoperable and Representational State Transfer-like (REST-like) manner.

The OpenID Connect specifies a Representational State Transfer-ful (RESTful) HyperText Transfer Protocol Application Programming Interface (HTTP API), using JavaScript Object Notation (JSON) as a data format. In some embodiments, the relying party device 112 associated with the relying party 114 may verify the identity of the user 102, including one or more attributes associated with the identity claim for the user 102 using a cryptographic challenge based on a cryptographic operation.

In some embodiments, the authorization protocol includes at least one parameter is selected from (i) an API authorization endpoint, (ii) a client ID, (iii) a call back URL (iv) a response type, and (v) a scope, as described below. In some embodiments, the relying party device 112 specifies a request for the at least one identity claim in the scope of the authorization protocol to retrieve the at least one identity claim from the digital identity wallet application 105.

An example OAuth specification of the relying party device 112 is
    https://cloud.trustedkey.com/v1/oauth/
        authorize?response_type=code&client_id=CLIEN
        T_ID&redirect_uri=CALLBACK_URL&scope=read.

Another example Open Authorization (OAuth) specification of the relying party device 112 is
    https://cloud.digitalocean.com/v1/oauth/
        authorize?response_type=code&client_id=CLIENT_
        ID&redirect_uri=CALLBACK_URL&scope=read.

In some embodiments, https://cloud.trustedkey.com/v1/oauth/authorize, specifies the application programming interface (API) authorization endpoint. The endpoint is one end of a communication channel. When an API interacts with another system, touchpoints of this communication are considered endpoints. For APIs, the endpoint includes the URL of a server or service. Each endpoint is a location from which APIs can access resources they need to carry out their function. In some embodiments, the APIs works using 'requests' and 'responses.' When the API requests information from a web application or web server, it may receive a response. The place that the APIs send requests and where the resource lives, is called the endpoint.

The endpoint may be an authorization endpoint, a token endpoint, or a redirection endpoint. The authorization endpoint is an endpoint in the authorization server where a resource owner logs in, that grants authorization to a user application. The authorization endpoint may be used to request tokens or authorization codes via the browser. The token endpoint is an endpoint on the authorization server where the user application exchanges the authorization code, client ID, and client secret for an access token. The client secret authenticates an identity of an application to the service API when the application requests to access a user's account. The token endpoint may be used to programmatically request for tokens. The redirect endpoint is an endpoint in the user application where the resource owner is redirected to, after having granted authorization at the authorization endpoint. In some embodiments, the authorization endpoint and the token endpoint are located on the authorization server.

The client ID specifies how the API identifies the client application. A redirect_uri=CALLBACK_URL is where the digital identity wallet application 105 redirects the user 102 after an authorization code is granted. The response_type=code specifies that the user application is requesting an authorization code grant. The scope=read specifies level of access that the application is requesting.

The digital identity wallet application 105 sends the at least one identity claim to the relying party device 112 based on the API call. The relying party device 112 processes each identity claim retrieved from the digital identity wallet application 105 to identify the by-reference identity claim. In some embodiments, the relying party device 112 receives the attribute values of the identity claims.

The relying party device 112 may request the user 102 to digitally sign the access token to dynamically retrieve the attribute value (e.g., the credit score of the user 102 associated with the by-reference identity claim from the issuing party 110 if the at least one identity claim is the by-reference identity claim). The user 102 uses a private key to digitally sign the access token using the user device 104. The relying party device 112 obtains (e.g., requests and receives) the digitally signed access token which is digitally signed by the user device 104 associated with the user 102. In some embodiments, the access token is digitally signed by the user 102 to retrieve the attribute value dynamically. In some embodiments, the digitally signed access token is valid for a specified period of time.

The relying party device 112 invokes the URL of the endpoint with the by-reference identity claim and the digitally signed access token that is digitally signed by the user device 104. The relying party device 112 dynamically retrieves the attribute value (e.g., the credit score of the user 102 associated with the by-reference identity claim from the issuing party device 108 associated with the issuing party 110).

An example pseudo code for the relying party device 112 is below:

```
OAuth_call (list_of_claims[ ], &access_token)
{
// First retrieve the list of claims and access token
...
// Now process each claim
For each claim in list_of_claims[ ]
  {
  If claim.By-Ref == TRUE
    {
    Retrieve_Claim_Value(claim.endpoint, access_token)
```

```
  }
// Else attribute value is already there in claim
  }
}
```

The issuing party device 108 listens to the URL of the endpoint that is invoked by the relying party device 112 to obtain the by-reference identity claim and the digitally signed access token. The issuing party device 108 validates the digitally signed access token. In some embodiments, the issuing party device 108 validates the digitally signed access token by verifying that the user public key associated with the at least one identity claim that corresponds to a user private key that was used to digitally sign the digitally signed access token. In some embodiments, if the relying party device 112 invokes the URL of the endpoint with a digitally signed access token that has a specified expiration time, the issuing party device 108 does not share the attribute value of the identity claim with the relying party 114 if the specified expiration time has occurred or has passed.

The issuing party device 108 dynamically returns the attribute value (e.g., the credit score of the user 102 associated with the by-reference identity claim to the relying party device 112 if the digitally signed access token is valid).

An example pseudo code for the issuing party device 108 is shown below:

```
Issue_Claim (STR claim_name, VAL value, BOOL by-ref, URL end-point)
{
If (by-ref == TRUE)
  {
  // Issue By-Ref claim
  Issue (claim_name, TRUE, end-point)
  }
Else
  {
  // Issue claim with embedded value
  Issue (claim_name, FALSE, value)
  }
}
```

Figure 2:
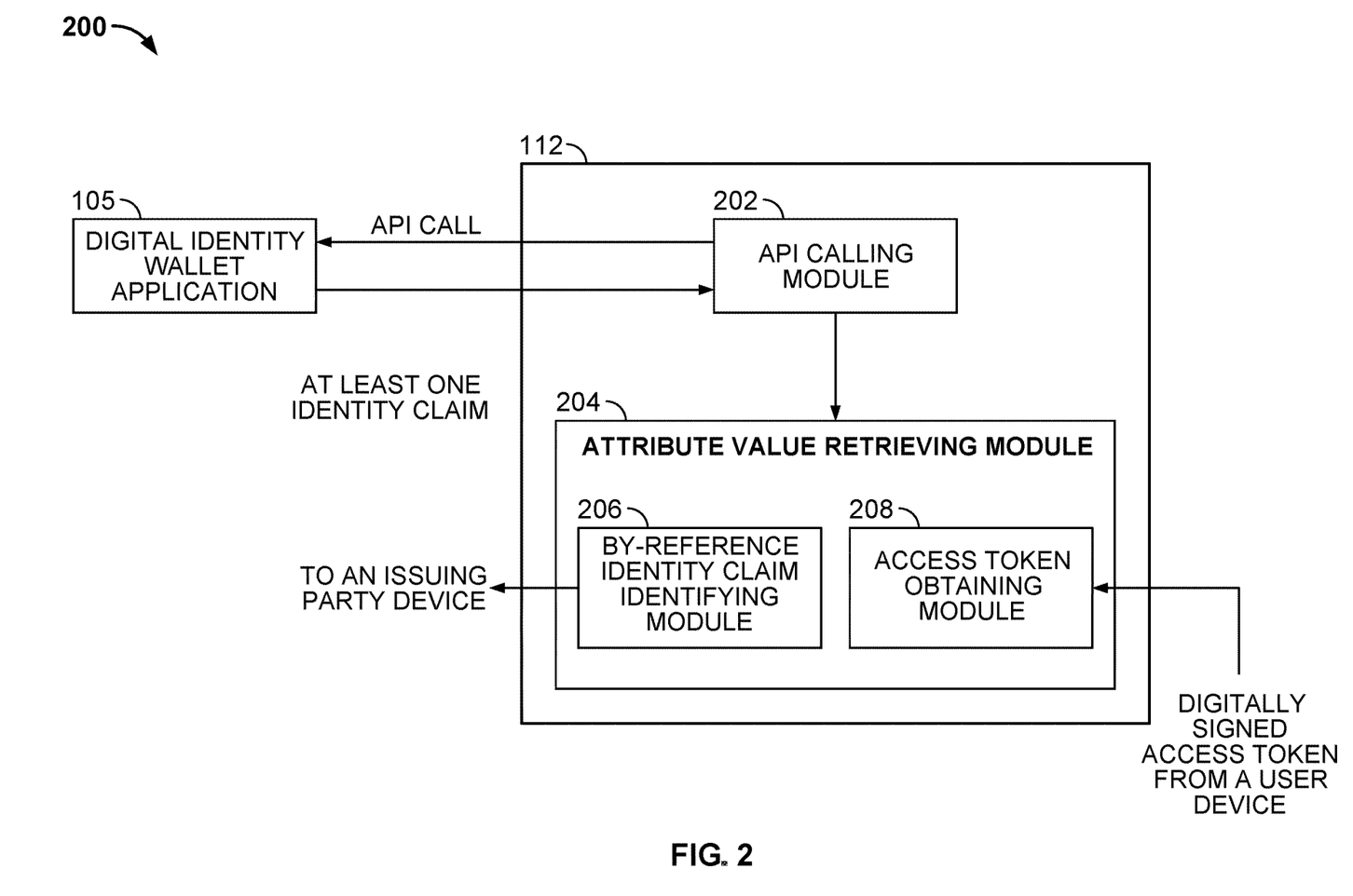
FIG. 2 is a block diagram of the relying party device of FIG. 1 according to some embodiments herein.

FIG. 2 is a block diagram 200 of the relying party device 112 of FIG. 1 according to some embodiments herein. The relying party device 112 may include an API calling module 202 and an attribute value retrieving module 204. The attribute value retrieving module 204 includes a by-reference identity claim identifying module 206 and an access token obtaining module 208.

The API calling module 202 makes an API call to retrieve the at least one of identity claim of the user 102. In some embodiments, the API calling module 202 makes the API call to the Digital Identity Wallet (DIW) application 105. In some embodiments, the API calling module 202 makes the API call based on an authentication protocol layered on an authorization protocol. The authorization protocol may include one or more parameters selected from (i) an API authorization endpoint, (ii) a client ID, (iii) a call back URL, (iv) a response type, and (v) a scope.

An example OAuth specification of the relying party device 112 is
https://cloud.trustedkey.com/v1/oauth/
authorize?response_type=code&client_id=CLIENT_ID&redirect_uri=CALLBACK_URL&scope=read.

In some embodiments, the API calling module 202 specifies a request for retrieving at least one identity claim in the scope of the authorization protocol.

The API calling module 202 receives the at least one of identity claim from the digital identity wallet application 105. The by-reference identity claim identifying module 206 processes each identity claim of the user 102 to identify at least one by-reference identity claim that includes a URL of an endpoint. In some embodiments, the access token obtaining module 208 requests the user 102 to digitally sign an access token if the at least one of identity claim is the at least one by-reference identity claim. The access token obtaining module 208 obtains a digitally signed access token which is digitally signed by the user device 104. In some embodiments, the user 102 uses the user device 104 to digitally sign the access token using a user private key. In some embodiments, the digitally signed access token is valid for a specified period of time.

The attribute value retrieving module 204 invokes the URL of the endpoint with the at least one by-reference identity claim and the digitally signed access token which is digitally signed by the user device 104. The attribute value retrieving module 204 dynamically retrieves the attribute value associated with the at least one by-reference identity claim from the issuing party device 108 associated with the issuing party 110.

Figure 3:
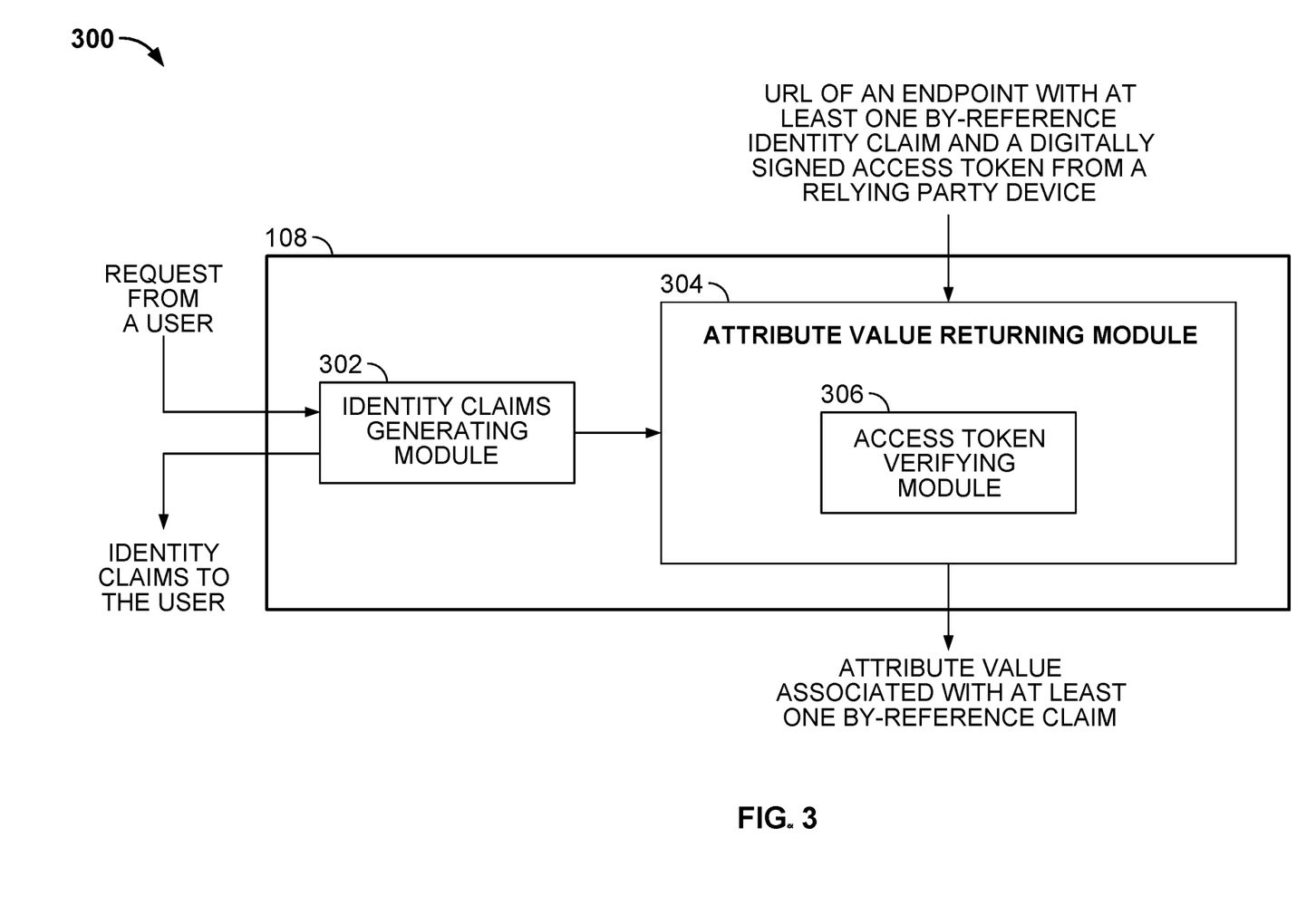
FIG. 3 is a block diagram of the issuing party device of FIG. 1 according to some embodiments herein.

FIG. 3 is a block diagram 300 of the issuing party device 108 according to some embodiments herein. The issuing party device 108 includes an identity claims generating module 302, and an attribute value returning module 304. The attribute value returning module 304 includes an access token verifying module 306. The identity claims generating module 302 generates at least one identity claim as least one by-reference identity claim that includes a URL of an endpoint. In some embodiments, the at least one by-reference is a type of identity claim where an attribute is obtained dynamically from the URL of the endpoint. In some embodiments, the at least one identity claim as the at least one by-reference identity claim is generated by embedding a user public key of the user 102 in the at least one identity claim and specifying the URL of the endpoint in the at least one by-reference identity claim. The identity claims generating module 302 issues the at least one identity claim as the at least one by-reference identity claim to the digital identity wallet application 105 associated with the user device 104.

The attribute value returning module 304 listens to the URL of the endpoint that is invoked by the relying party device 112 to obtain the at least one by-reference identity claim and a digitally signed access token that is digitally signed by the user device 104. The access token verifying module 306 validates the digitally signed access token. In some embodiments, the access token verifying module 306 validates the digitally signed access token by verifying that the user public key associated with the at least one identity claim corresponds to a user private key that was used to digitally sign the digitally signed access token. In some embodiments, the access token verifying module 306 compares the user private key used by the user 102 to digitally sign the access token with the user public key associated with the at least one identity claim.

The attribute value returning module 304 dynamically returns an attribute value associated with the at least one by-reference identity claim to the relying party device 112 associated with the relying party 114 if the digitally signed access token is valid. In some embodiments, the attribute value returning module 304 may not return the attribute value associated with the at least one by-reference identity claim to the relying party device 112 associated with the relying party 114 if the user private key was used to digitally sign the digitally signed access token does not match with the user public key associated with the at least one identity claim. In some embodiments, if the relying party device 112 associated with the relying party 114 invokes the URL of the endpoint with a digitally signed access token that has an expiration time, the attribute value returning module 304 does not share the attribute value of the at least one identity claim to the relying party device 112 if the expiration time has occurred or has passed.

Figure 4:
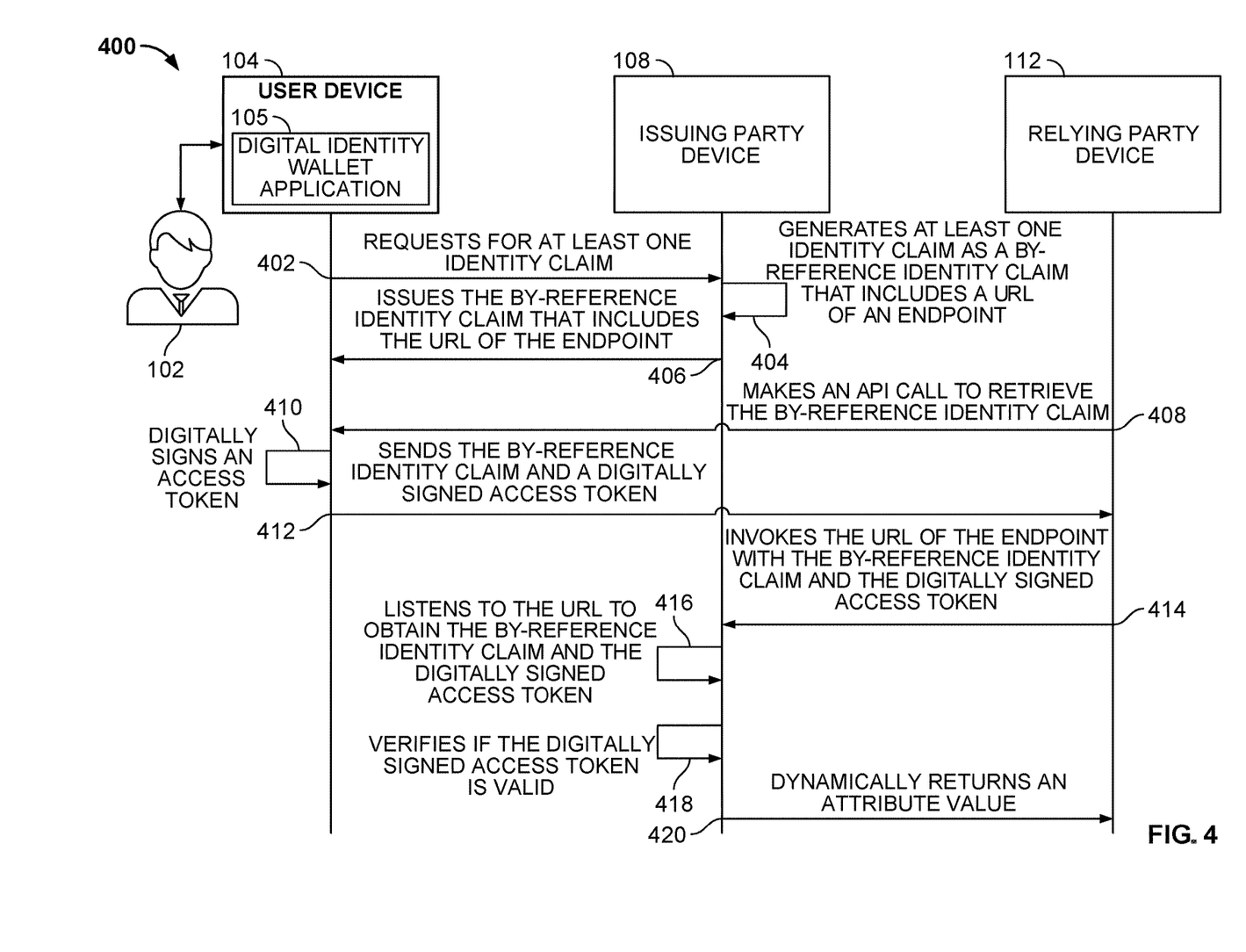
FIG. 4 is an interaction diagram that illustrates a method for dynamically retrieving an attribute value of an identity claim for a user from an issuing party device associated with an issuing party and dynamically returning the attribute value to a relying party device associated with a relying party according to some embodiments herein.

FIG. 4 is an interaction diagram that illustrates a method 400 for dynamically retrieving an attribute value of an identity claim for the user 102 from the issuing party device 108 associated with the issuing party 110 and dynamically returning the attribute value to the relying party device 112 associated with the relying party 114 according to some embodiments herein. At step 402, the method 400 includes the user 102 with the user device 104 using the DIW application 105 to request the issuing party device 108 associated with the issuing party 110 (e.g., a credit score agency) to issue at least one identity claim (e.g., that includes a credit score as an attribute value) to enable the user 102 to obtain a service from the relying party 114 (e.g., a bank) as introduced in FIG. 1. The at least one identity claim may include at least one attribute, such as: (i) a first name; (ii) a last-name; (iii) a date-of-birth (DOB); and (iv) the credit score. In some embodiments, the user 102 may request the issuing party 110 to issue the at least one identity claim for at least one of (i) a Cumulative Grade Point Average (CGPA); (ii) data containing Protected Health Information (PHI); or (iii) a medical diagnostic image such as a Magnetic Resonance Imaging (MRI) image, a Computed Tomography (CT) image, an X-ray image, a Positron-Emission Tomography (PET) image or a sonogram. The first name, the last name, and the date of birth may be static attributes that typically remain constant, but the credit score often varies with time (e.g., every month). In another example, the CGPA may vary with time (e.g., every semester or every year). In another example, the identity claim may include a file that is too large in size to embed in the identity claim. For example, the file may be the X-Ray image, the MRI image, etc.

At step 404, the method 400 includes the issuing party device 108 receiving the request from the user device 104 and generating the at least one identity claim as a by-reference identity claim that includes a uniform resource locator (URL) of an endpoint. In some embodiments, the issuing party device 108 embeds the URL of the endpoint from which the actual attribute value can be retrieved at a later time. In some embodiments, the issuing party device 108 shares a derived attribute value (e.g., a Boolean value) instead of sharing an actual attribute value to the relying party 114. For example, the Boolean value may be equal to 1, if an age of the user 102 is greater than 18 and the Boolean value may be equal to 0 if the age of the user is less than 18. If the relying party device 112 wants the attribute value associated with the by-reference identity claim (e.g., the credit score of the user 102) the relying party device 112 may invoke the URL of the endpoint that is specified in the by-reference identity claim and pass in a digitally signed access token that is digitally signed by the user device 104.

In some embodiments, the derived attribute value is dynamically retrieved by the relying party device 112. In some embodiments, the derived attribute value may include more than two possible attribute values depending on their corresponding data ranges. For example, the relying party 114 may want to know an age group of the user 102 (e.g., the user 102 may be 15 to 25 years of age, or 26 to 35 years of age, etc.). The issuing party 110 may send the derived attribute value instead of sending the attribute value to the relying party 114. This enables the issuing party 110 to preserve the privacy and security of the actual attribute value.

At step 406, the method 400 includes the issuing party device 108 issuing the at least one identity claim as the by-reference identity claim requested from the user device 104. In some embodiments, the issuing party device 108 issues the by-reference identity claim for attributes that vary with time such as the credit score, the CGPA, a health parameter (e.g., blood sugar or cholesterol level). In some embodiments, the issuing party device 108 issues the by-reference identity claim for the attributes that are large in size (e.g., medical images such as the X-Ray, the MRI, etc.). In some embodiments, the issuing party device 108 issues the by-reference identity claim for the attributes that need to be protected for privacy reasons (e.g., an address, the date of birth, etc.). In some embodiments, the issuing party device 108 issues the by-reference identity claim for the attributes that need to be protected for regulatory reasons (e.g., data containing PHI such as clinical trial data of patients). In some embodiments, the issuing party device 108 issues the by-reference identity claim for the attributes that are determined using proprietary methodologies (e.g., a mathematical formula which is a trade secret).

In some embodiments, the by-reference identity claim is stored in the digital identity wallet application 105 based on the request from the user device 104. In one example embodiment, the user 102 may initiate a loan process to apply for a loan from the relying party 114 (e.g., a bank based on the at least one identity claim that is stored in the digital identity wallet application 105).

At step 408, the method 400 includes the relying party device 112 making an API call to retrieve at least one identity claim from the digital identity wallet application 105. In some embodiments, the relying party device 112 makes the API call to the user device 104 based on an authentication protocol (e.g., the OpenID Connect authentication protocol) layered on an authorization protocol. In some embodiments, the authorization protocol includes at least one parameter that is selected from (i) an API authorization endpoint, (ii) a client ID, (iii) a call back URL, (iv) a response type, and (v) a scope, as described below. In some embodiments, the relying party device 112 specifies the request for the at least one identity claim in the scope of the authorization protocol to retrieve the at least one identity claim from the digital identity wallet application 105.

At step 410, the method 400 includes the user device 104 digitally signing the access token to obtain a digitally signed access token. In some embodiments, the user 102 uses the user device 104 to digitally sign the access token using a user private key. In some embodiments, the digitally signed access token is valid until a specified expiration time, e.g., Apr. 16, 2019 at 12:00 am. In one example embodiment, if the relying party device 112 invokes the URL of the endpoint with a digitally signed access token that has an expiration time, the issuing party device 108 does not share the attribute value of the identity claim with the relying party 114 if the specified expiration time has passed or has occurred. The digital identity wallet (DIW) application 105 enables the user 102 to specify the expiration time. This gives the user 102 the ability to control the time until which the relying party 114 is able to retrieve the attribute value of the identity claim.

At step 412, the method 400 includes the digital identity wallet (DIW) application 105 sending the by-reference identity claim and the digitally signed access token corresponding to the relying party device 112 associated with the relying party 114 based on the API call. At step 414, the method 400 includes the relying party device 112 invoking the URL of the endpoint with the by-reference identity claim and the digitally signed access token.

At step 416, the method 400 includes the issuing party device 108 listening to the URL of the endpoint to obtain the by-reference identity claim and the digitally signed access token. At step 418, the method 400 includes the issuing party device 108 validating the digitally signed access token (e.g., by verifying that a user public key) associated with the at least one identity claim, corresponds to the user private key used by the user 102 to digitally sign the access token.

At step 420, the method 400 includes the issuing party device 108 dynamically returning the attribute value (e.g., the credit score of the user 102) associated with the by-reference identity claim to the relying party device 112 associated with the relying party 114 if the digitally signed access token is valid.

Figure 5:
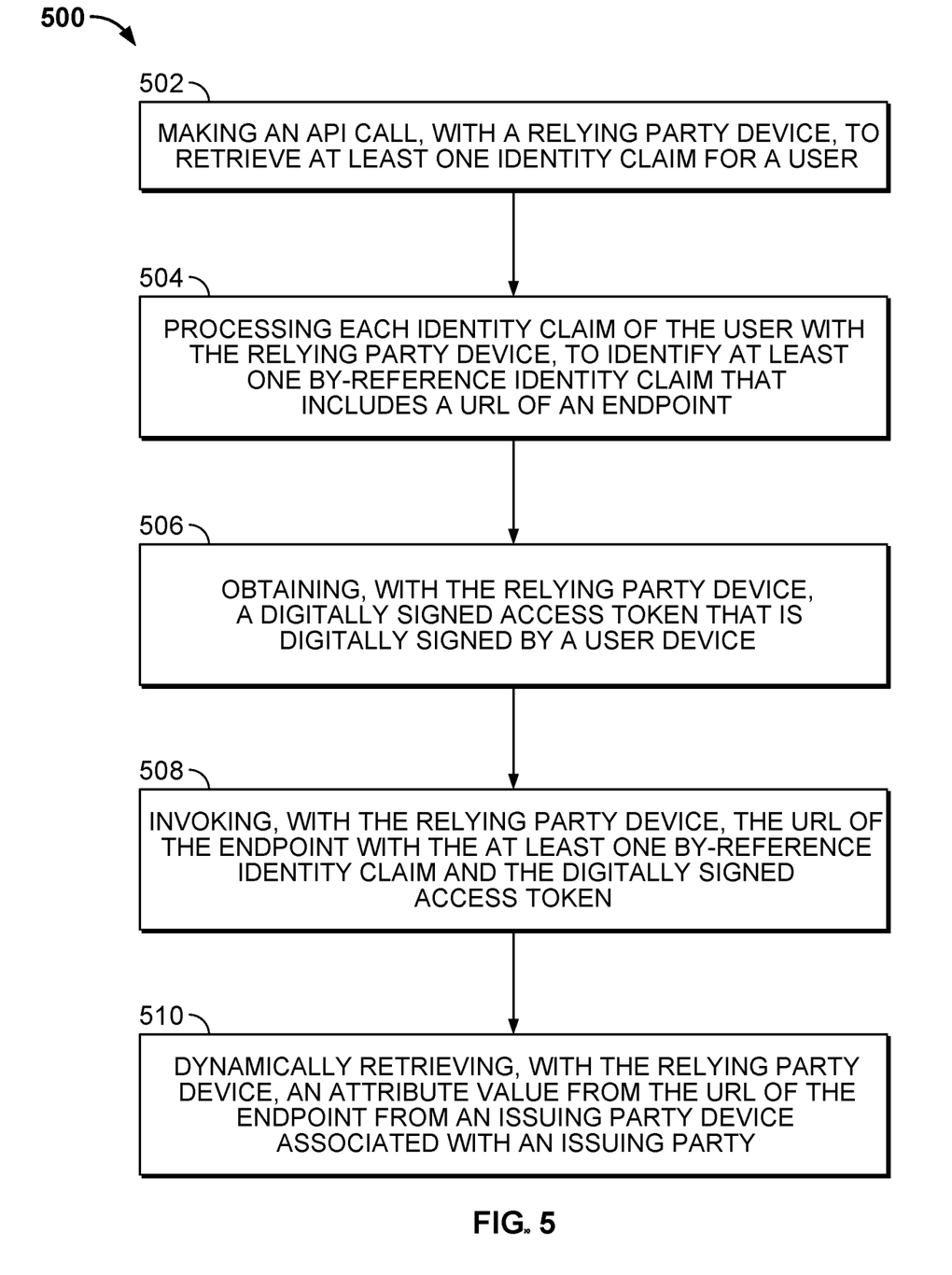
FIG. 5 is a flow diagram that illustrates a method for dynamically retrieving an attribute value of at least one identity claim for a user, at a relying party device associated with a relying party according to some embodiments herein.

FIG. 5 is a flow diagram that illustrates a method 500 for dynamically retrieving an attribute value of at least one identity claim for the user 102, at the relying party device 112 associated with the relying party 114 according to some embodiments herein. At step 502, the method 500 includes making an API call, with the relying party device 112, to retrieve the at least one identity claim for the user 102. The at least one identity claim may include at least one attribute, such as: (i) a first name, (ii) a last-name, (iii) a date-of-birth, and (iv) a credit score of the user 102. At step 504, the method 500 includes processing each identity of the user 102, with the relying party device 112, to identify at least one by-reference identity claim that includes a URL of an endpoint. At step 506, the method 500 includes obtaining, with the relying party device 112, a digitally signed access token that is digitally signed by the user device 104. At step 508, the method 500 includes invoking, with the relying party device 112, the URL of the endpoint with the at least one by-reference identity claim and the digitally signed access token that is digitally signed by the user device 104. At step 510, the method 500 includes dynamically retrieving, with the relying party device 112, the attribute value (e.g., the credit score of the user 102 from the URL of the endpoint from the issuing party device 108 associated with the issuing party 110).

Figure 6:
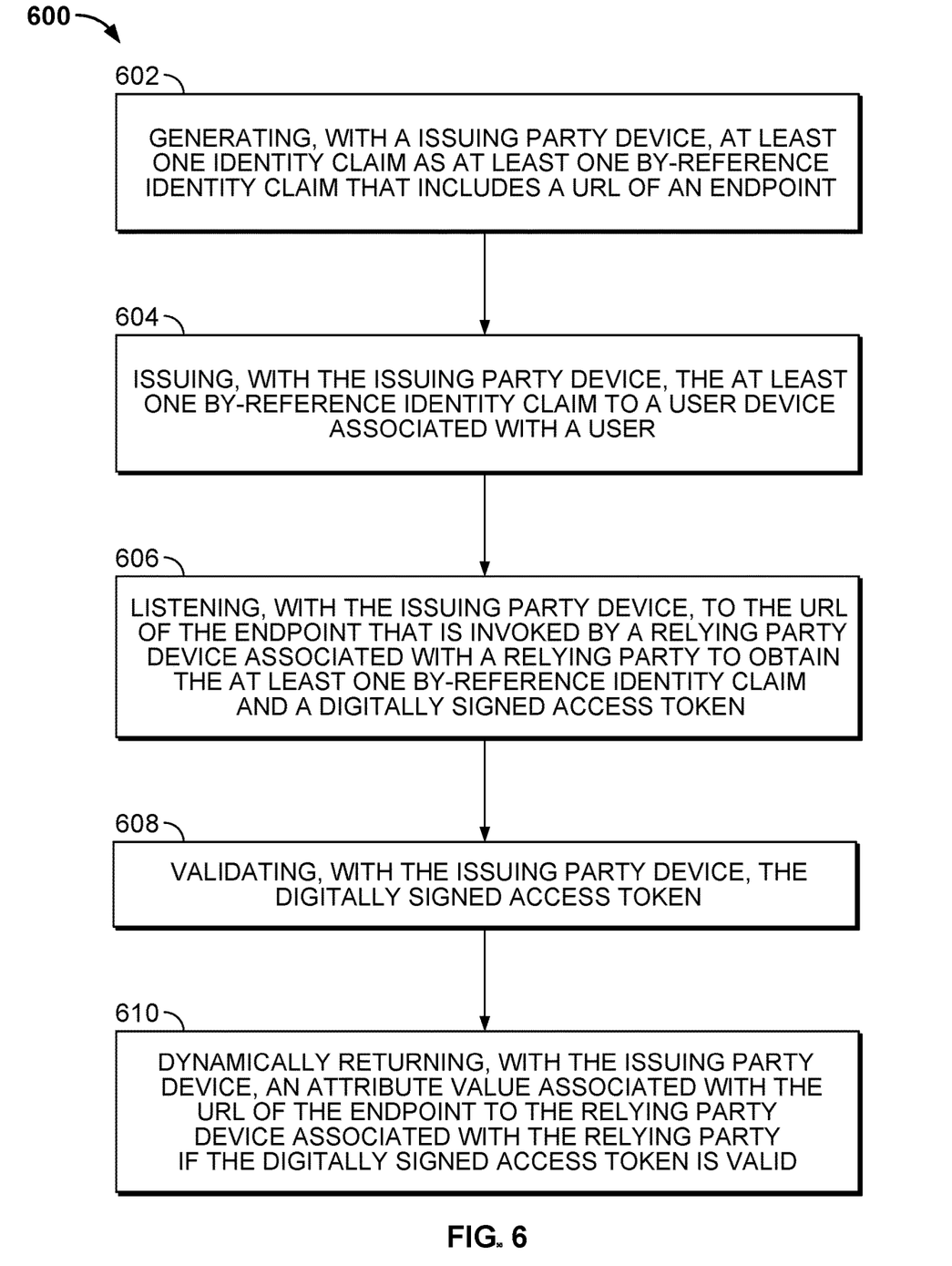
FIG. 6 is a flow diagram that illustrates a method for generating the at least one identity claim as at least one by-reference identity claim at an issuing party device associated with an issuing party and dynamically returning an attribute value associated with the at least one by-reference identity claim to the relying party device associated with the relying party according to some embodiments herein.

FIG. 6 is a flow diagram that illustrates a method 600 for generating at least one identity claim as at least one by-reference identity claim at the issuing party device 108 associated with the issuing party 110 and dynamically returning an attribute value associated with the at least one by-reference identity claim to the relying party device 112 associated with the relying party 114 according to some embodiments herein. At step 602, the method 600 includes generating, with the issuing party device 108, the at least one identity claim as the at least one by-reference identity claim that includes a URL of an endpoint. The issuing party device 108 issues the at least one identity claim for at least one of: (i) a first-name, (ii) a last-name, and (iii) a date-of-birth of the user 102 as attribute values. In some embodiments, the issuing party device 108 issues the by-reference identity claim for attributes that vary with time such as a credit score, a CGPA, a health parameter (e.g., blood sugar or cholesterol level). At step 604, the method 600 includes issuing, with the issuing party device 108, the at least one by-reference identity claim to the user device 104 associated with the user 102. At step 606, the method 600 includes listening, with the issuing party device 108, to the URL of the endpoint that is invoked by the relying party device 112 to obtain the at least one by-reference identity claim and a digitally signed access token. At step 608, the method 600 includes validating, with the issuing party device 108, the digitally signed access token. In some embodiments, the digitally signed access token is validated by verifying that a user public key associated with the at least one identity claim corresponds to a user private key that was used to digitally sign the digitally signed access token. At step 610, the method 600 includes dynamically returning, with the issuing party device 108, the attribute value, e.g., the credit score of the user 102 associated with the at least one by-reference identity claim to the relying party device 112 associated with the relying party 114 if the digitally signed access token is valid.

Figure 7:
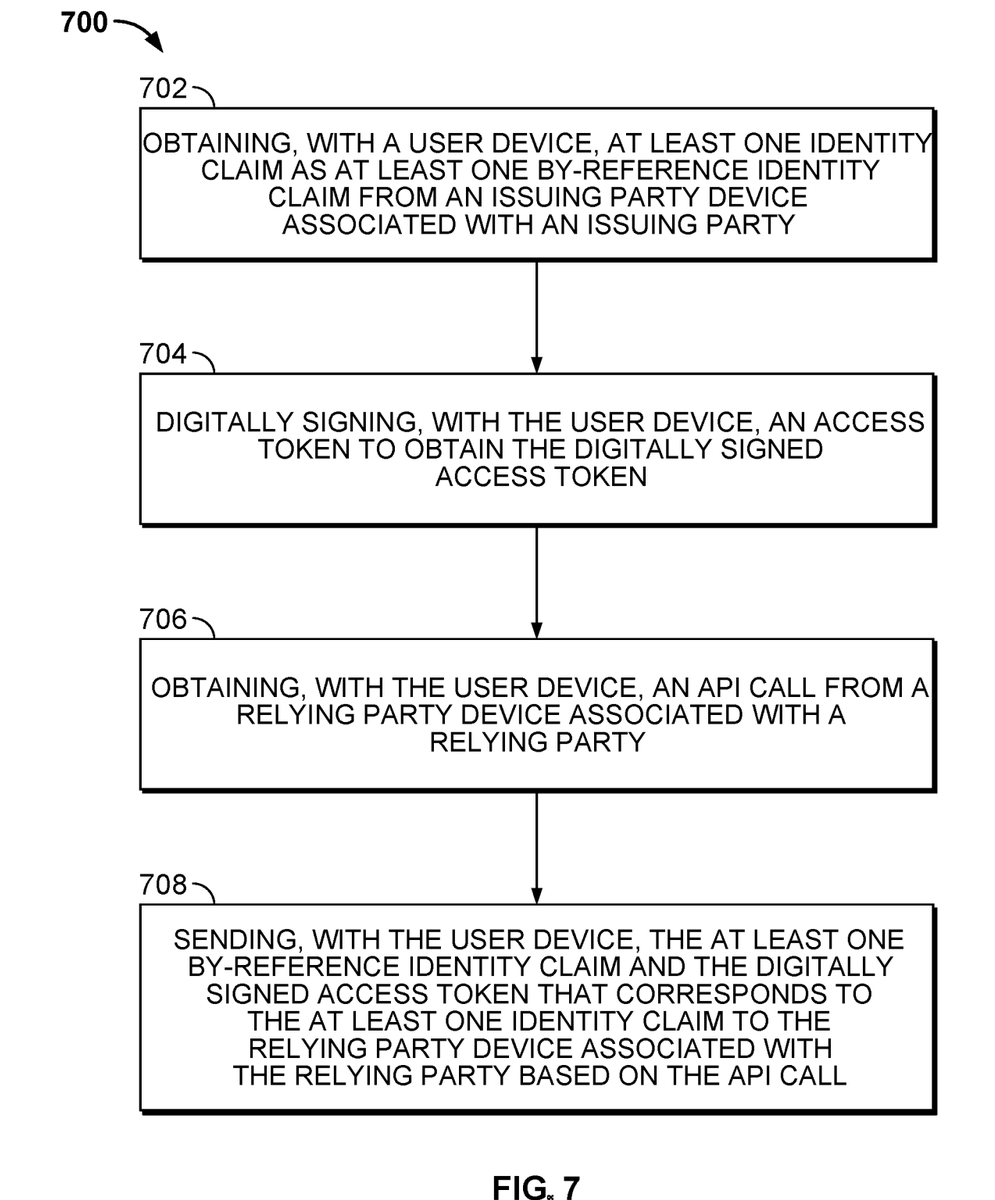
FIG. 7 is a flow diagram that illustrates a method for sending the at least one by-reference identity claim and a digitally signed access token from a user device associated with the user to the relying party device associated with the relying party according to some embodiments herein.

FIG. 7 is a flow diagram that illustrates a method 700 for sending at least one by-reference identity claim and a digitally signed access token from the user device 104 associated with the user 102 to the relying party device 112 associated with the relying party 114 according to some embodiments herein. At step 702, the method 700 includes obtaining, with the user device 104, at least one identity claim as the at least one by-reference identity claim from the issuing party device 108. The at least one by-reference identity includes a URL of an endpoint of an attribute value, e.g., a credit score of the user 102. At step 704, the method 700 includes digitally signing, with the user device 104, an access token to obtain the digitally signed access token. In some embodiments, the user 102 uses the user device 104 to digitally sign the access token using a user private key. In some embodiments, the digitally signed access token is valid for a specified period of time. At step 706, the method 700 includes obtaining, with the user device 104, an API call from the relying party device 112. At step 708, the method 700 includes sending, with the user device 104, the at least one by-reference identity claim and the digitally signed access token that corresponds to the at least one identity claim to the relying party device 112 associated with the relying party 114 based on the API call.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps. The embodiments herein can include both hardware and software elements. The embodiments that are implemented in software include but are not limited to, firmware, resident software, microcode, etc. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
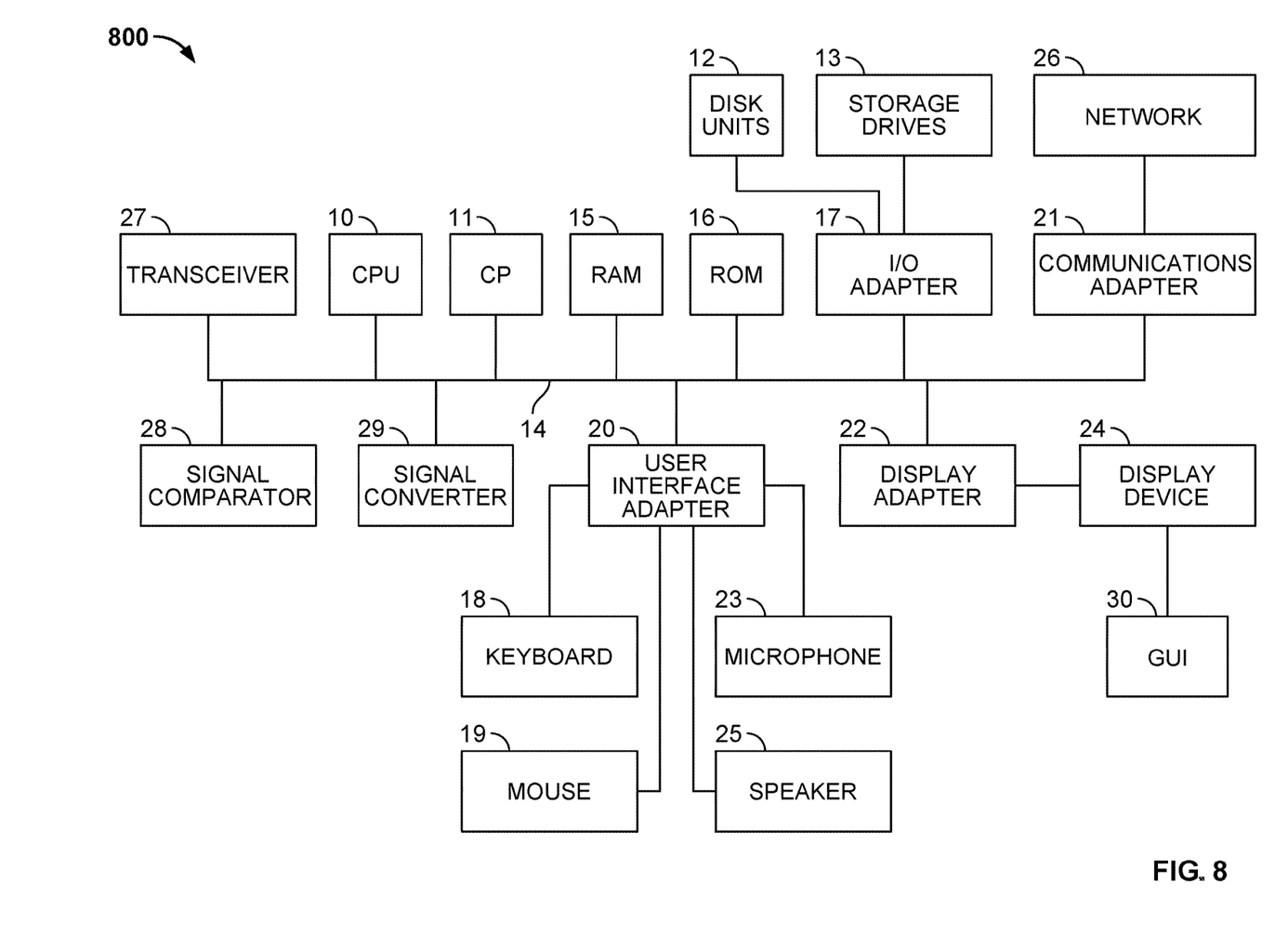
FIG. 8 is a block diagram of a schematic diagram of a device used in accordance with embodiments herein.

A representative hardware environment for practicing the embodiments herein is depicted in FIG. 8, with reference to FIGS. 1 through 7. This schematic drawing illustrates a hardware configuration of a server/computer system/user device 104 in accordance with the embodiments herein. The user device 104 includes at least one processing device CPU 10 and a cryptographic processor 11. The special-purpose CPU 10 and the cryptographic processor (CP) 11 may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The user device 104 can read the inventive instructions on the program storage devices and follow these instructions to execute the methodology of the embodiments herein. The user device 104 further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method, comprising:
    making an API call to retrieve at least one identity claim for a user;
    processing, using a processor, each identity claim of the user to identify at least one by-reference identity claim that includes a URL of an endpoint;
    obtaining a digitally signed access token that is digitally signed by a user device;
    invoking the URL of the endpoint with the at least one by-reference identity claim and passing in the digitally signed access token; and
    dynamically retrieving an attribute value from the URL of the endpoint from an issuing party device associated with an issuing party.

2. The method of claim 1, wherein a relying party device makes the API call to retrieve the at least one identity claim for the user from a digital identity wallet (DIW) application associated with the user device.

3. The method of claim 2, wherein the relying party device makes the API call based on an authentication protocol layered on an authorization protocol, wherein the authorization protocol comprises at least one parameter, wherein the at least one parameter is selected from (i) an API authorization endpoint, (ii) a client ID, (iii) a call back URL, (iv) a response type, and (v) a scope.

4. The method of claim 3, wherein the relying party device specifies a request for the at least one identity claim in the scope of the authorization protocol to retrieve the at least one identity claim from the digital identity wallet application.

5. The method of claim 1, wherein the at least one by-reference identity claim is generated by embedding a user public key of the user in the at least one identity claim and specifying the URL of the endpoint in the at least one by-reference identity claim.

6. The method of claim 1, wherein the issuing party device validates the digitally signed access token by verifying that the user public key associated with the at least one identity claim corresponds to a user private key that was used to digitally sign the digitally signed access token.

7. The method of claim 1, wherein if a relying party device invokes the URL of the endpoint with a specific digitally signed access token that has an expiration time, an issuing party device does not share the attribute value of the identity claim with the relying party device if the expiration time has occurred or has passed.

8. The method of claim 1, wherein the attribute value is a derived attribute value which is derived from an actual attribute value, wherein the derived attribute value is dynamically retrieved by a relying party device, and wherein the derived attribute value is generated by the issuing party device.

9. The method of claim 1, wherein the user device obtains the at least one identity claim as the at least one by-reference identity claim from the issuing party device, wherein the at least one by-reference identity includes the URL of the endpoint of the attribute value; digitally signs an access token to obtain the digitally signed access token; receives the API call from a relying party device; and sends the at least one by-reference identity claim and the digitally signed access token that corresponds to the at least one identity claim to the relying party device based on the API call.

10. A computer program product for false positive detection, the computer program product being embodied in a non-transitory computer readable storage medium and comprising computer instructions for:
    making an API call to retrieve at least one identity claim for a user;
    processing, using a processor, each identity claim of the user to identify at least one by-reference identity claim that includes a URL of an endpoint;
    obtaining a digitally signed access token that is digitally signed by a user device;
    invoking the URL of the endpoint with the at least one by-reference identity claim and passing in the digitally signed access token; and
    dynamically retrieving an attribute value from the URL of the endpoint from an issuing party device associated with an issuing party.

11. The computer program product of claim 10, wherein a relying party device makes the API call to retrieve the at least one identity claim for the user from a digital identity wallet (DIW) application associated with the user device.

12. The computer program product of claim 11, wherein the relying party device makes the API call based on an authentication protocol layered on an authorization protocol, wherein the authorization protocol comprises at least one parameter, wherein the at least one parameter is selected from (i) an API authorization endpoint, (ii) a client ID, (iii) a call back URL, (iv) a response type, and (v) a scope.

13. The computer program product of claim 12, wherein the relying party device specifies a request for the at least one identity claim in the scope of the authorization protocol to retrieve the at least one identity claim from the digital identity wallet application.

14. The computer program product of claim 10, wherein the at least one by-reference identity claim is generated by embedding a user public key of the user in the at least one identity claim and specifying the URL of the endpoint in the at least one by-reference identity claim.

15. The computer program product of claim 10, wherein the issuing party device validates the digitally signed access token by verifying that the user public key associated with the at least one identity claim corresponds to a user private key that was used to digitally sign the digitally signed access token.

16. The computer program product of claim 10, wherein if the relying party device invokes the URL of the endpoint with a specific digitally signed access token that has an expiration time, the issuing party device does not share the attribute value of the identity claim with the relying party device if the expiration time has occurred or has passed.

17. The computer program product of claim 10, wherein the attribute value is a derived attribute value which is derived from an actual attribute value, wherein the derived attribute value is dynamically retrieved by the relying party device, and wherein the derived attribute value is generated by the issuing party device.

18. The computer program product of claim 10, wherein the user device obtains the at least one identity claim as the at least one by-reference identity claim from the issuing party device, wherein the at least one by-reference identity includes the URL of the endpoint of the attribute value; digitally signs an access token to obtain the digitally signed access token; receives the API call from a relying party device; and sends the at least one by-reference identity claim and the digitally signed access token that corresponds to the at least one identity claim to the relying party device based on the API call.

* * * * *